;United States Patent [19]

Terhardt

[11] Patent Number: 5,382,394
[45] Date of Patent: Jan. 17, 1995

[54] APPARATUS AND METHOD FOR SUPPLYING VISCOUS BLENDS THAT CURE

[75] Inventor: Josef Terhardt, Rhede, Germany

[73] Assignee: Verfahrenstechnik Hubers GmbH, Bocholt/Westf., Germany

[21] Appl. No.: 80,267

[22] Filed: Jun. 21, 1993

[51] Int. Cl.⁶ .................. B29C 31/10; B29C 45/12; B29C 45/20
[52] U.S. Cl. .................. 264/40.7; 264/102; 264/240; 264/328.6; 425/145; 425/166; 425/543; 425/546; 425/562
[58] Field of Search .................. 264/40.7, 240, 328.5, 264/102, DIG. 83, 366, 37, 328.6, 328.8; 425/145, 146, 149, 166, 543, 546, 562

[56] References Cited

U.S. PATENT DOCUMENTS 3,621,892 11/1971 Gillespie .................. 264/102
3,853,446 12/1974 Hostettler et al. .................. 264/328.5
4,296,212 10/1981 Ewen et al. .................. 264/DIG. 83
4,399,105 8/1983 Tilgner et al. .................. 264/DIG. 83

Primary Examiner—Mathieu D. Vargot
Attorney, Agent, or Firm—Sprung Horn Kramer & Woods

[57] ABSTRACT

Apparatus for and method of supplying viscous blends, casting resins for example, of two or more components that react and cure when blended, preferably in a vacuum. There is one holding tank for each component. There is a set of flow controls downstream of each holding tank. There is check valve downstream of each set of flow controls. There is a line downstream of each set of flow controls or of each check valve. Blenders communicate with each line. An injector downstream of each blender supplies the blend to a compression-setting mold. The line leading out of each holding tank and through the flow controls and check valve extends past each blender and back into the tank, accordingly constituting a closed loop that begins and ends at the tanks. The loops extend through FORWARD/DIVERT valves with one intake and two alternatively opening and closing outlets. One outlet forwards the component on through its loop. The other outlet diverting it out of the loop to one of the blenders.

15 Claims, 4 Drawing Sheets

APPARATUS AND METHOD FOR SUPPLYING VISCOUS BLENDS THAT CURE

BACKGROUND OF THE INVENTION

The present invention concerns, first, apparatus for supplying viscous blends, casting resins for example, of two or more components that react and cure when blended, preferably in a vacuum. The apparatus comprises
   a) one holding tank for each component,
   b) a set of flow controls downstream of each holding tank,
   c) a valve, a check valve for example, in or downstream of each set of flow controls as necessary,
   d) a line downstream of each set of flow controls or of each check valve,
   e) blenders communicating with each line, and
   f) an injector downstream of each blender and supplying the blend to a compression-setting mold for example,

DESCRIPTION OF RELATED ART

Apparatus of this genus is known, from German 3 421 581 A1 for example.

A similar design is also disclosed in German 2 748 982 C3. Downstream of two holding tanks 4 and 5 are two variable-capacity pumps 6 and 6' that provide their components to a blender 7. Another pump, not illustrated but mentioned in column 1, line 65, forwards the blend through what are called buffers 3 to various molds of different capacity. How much blend is supplied to each mold is apparently dictated by variable-capacity valves 9. The publication cites shrinkage of the molding as a problem and proposes pumping more blend through the variable-capacity pump. One drawback is that no blend can be supplied to other molds while the extra blend is being added. The purpose of the buffers is to relieve the pumps and blenders of backward pressure while the blend is curing in the mold. The buffers maintain a specific pressure while the blend is curing and accordingly shrinking in the mold. The buffers also add blend to the mold to compensate for the shrinkage. The pumps are accordingly relieved of the pressure maintained while the blend is curing. It is also claimed that the buffer makes it possible to supply several parallel molds from a single source of blend. This would allow multiple exploitation of the pumps and associated devices and accordingly satisfactory utilization of expensive apparatus.

The associated increased consumption of blend would be of advantage in terms of the limited time the reacting blend can be left in the apparatus. The publication also mentions that residue, especially fillers, can clog up the lines. To prevent this, pumps 6 and 6' are claimed to be designed to return to the vacuum line some of the blend vacuumed in during the suction stroke, resulting in constant rinsing.

The initially cited publication also addresses the problem of charging as many molds as possible as rapidly as possible with the object of maximizing output without detriment to flow-control accuracy (page 6). This objective is attained according to the publication by simultaneously activating parallel variable-capacity pumps supplied with blend from the same blender through a branch.

The drawbacks shared by both known apparatus is that the branches behind each common blender cause major problems when the blend cures rapidly inside it. Polyurethane for example cures much more rapidly than conventional epoxy resins for example. It is also extremely difficult and time-consuming to replace or vary the proportions of components. It is impossible for example to continuously charge compression-setting molds with different ratios.

There is another drawback to the state of the art, particularly the prior art represented by German 2 748 982, in that the blend inside the buffer cannot be replaced and will remain there until it hardens and clogs up the apparatus. This problem does not occur to the same extent in the more recent German 3 421 581 A1), which specifies individual blend-forwarding mechanisms (plungers). The blend is much easier to replace and there is not as much dead space.

The object of the present invention is an improvement in the more recent state of the art making it possible to work with blends that cure substantially more rapidly than most conventional casting blends, epoxy resins for example. It will in particular be possible when necessary to vary the proportions for example without time-consuming preparation or even to supply different setting molds with different proportions of blend in the midst of an operation.

SUMMARY OF THE INVENTION

This object is attained in that the line leading out of each holding tank and through the flow controls and check valves extends past each blender and back into the tank, accordingly constituting a closed loop that begins and ends at the tanks.

This design results in several simultaneous advantages. First, since the components constantly circulate through the closed loops in the apparatus in accordance with the invention, the filler-laden components will be much less likely to clog up the line. Again the section that accommodates the blended and reacting blend is much shorter, and blends that cure substantially more rapidly than conventional epoxy resins can be employed. Furthermore, the apparatus in accordance with the invention makes it possible to compensate for shrinkage when necessary without the risk of clogging and when rapidly curing blends cannot be employed. Finally, the apparatus makes it possible to supply different downstream compression-setting molds or similar structures with blends of different proportions simultaneously or during the same operation through several independent blenders supplied from the loops.

The loops can extend through FORWARD/DIVERT valves with one intake and two alternatively opening and closing outlets, one outlet forwarding the component on through its loop and the other outlet diverting it out of the loop to one of the blenders. This feature is particularly effective, as will be explained hereinafter.

It is also of advantage for each flow control to be a variable-capacity pump upstream of a check valve.

The injectors can be blend-forwarding plunger-and-cylinder injectors, preferably upstream of an ON-OFF valve. The ON-OFF valve can communicate with a spout that opens into a cast or mold, specifically a compression-setting mold.

A pressure gauge between the compression-setting mold and the ON-OFF valve can govern the operation of the injector, ensuring for example that the compression-setting mold is supplied with extra blend at a specific minimal pressure and for a long enough time, throughout the curing process for example, in order to compensate for shrinkage.

It is, however, also possible in principle for the blender to generate back-up pressure and apply it at this point. The drawbacks of such an approach are discussed in German 2 748 982 C3. They are the necessity of keeping the pumps pressurized, flow-rate errors as the result of unavoidable leaks, and the interruption of operations while the blend cures, preventing other molds from being charged at the same time. These drawbacks are not present in accordance with the invention because every mold can be assigned its own injector, operating independently of the other operating injectors, and because pumps of more recent design will not leak as is claimed to be unavoidable in the prior publication. Furthermore, the newer pumps do not use the liquid sealants that can contaminate the blend.

Valves that engage and disengage at least one of the two or more lines leading from the loops can be positioned just upstream of the blenders. It will accordingly be possible to prevent all the components with the exception of the main component for example from entering the blender, gradually forcing out the reacting blend and replacing it with a non-reactive component. Any parts of the apparatus adjacent to the blender can be "rinsed" in the same way, which can be done to advantage before shutting down or at regular intervals to allow maintenance. This procedure will prevent reactive blend from remaining in the blender or in downstream lines, pumps, or spouts, where it can settle or separate. It will also be possible to eliminate the conventional rinsing with solvents, which are increasingly to be avoided for environmental reasons. The proportions of the blend can also rapidly be altered, with an existing blend replaced with another blend in just a few cycles.

Rinsing can be facilitated even further with a bypass between the spout and the compression-setting mold or downstream of the valve, in particular however directly downstream of the spout, that conveys the material, one of the components for example, employed to rinse out the apparatus past the mold and either into a receptacle for disposal or further processing or back to the holding tank.

Timers to synchronize the various mechanisms, especially the valves and pumps, are practical.

The invention also concerns a method of operating apparatus for supplying viscous blends, casting resins for example, of two or more components that react and cure when blended, preferably in a vacuum, the apparatus comprising
  a) one holding tank for each component,
  b) a set of flow controls downstream of each holding tank,
  c) a valve, a check valve for example, in or downstream of each set of flow controls as necessary, and
  d) a closed loop downstream of each set of flow controls and check valve and leading up to each blender and then back to the holding tank, whereby
  e) each loop extends through FORWARD/DIVERT valves with one intake and two alternatively opening and closing outlets, one outlet forwarding the component on through the loop and the other outlet diverting it out of the loop to one of the blenders.

This method is characterized in accordance with the invention in that
  1. first, the flow controls continue supplying each loop with its particular component until it is fully charged and the component is returning to the holding tank,
  2. second, the FORWARD/DIVERT valves that divert the components to a particular blender disestablish communications with the loops and divert the components flowing through the loops to the blender
  3. third, the flow controls remain in operation until the blender contains a specific volume of the components,
  4. fourth, the first and second steps are repeated with at least one more blender,
  5. fifth, the blenders proceed to blend the components and if necessary condition the blend, and
  6. sixth, the blend is introduced into molds, compression-setting molds for example, through the injectors.

Such a method will prevent the components from settling in the lines that supply the blenders and the blend will not cure in the apparatus. The method is also very flexible from the aspect of proportions.

Since both the second, third, and fourth steps and the fifth and sixth steps can be carried out independently and accordingly either simultaneously or overlapping, one blender will not have to wait for another blender, and the operation can be ideally accelerated.

Once the second through fourth steps (charging the blenders) or second through sixth steps (charging the molds) have been repeated a specific number of times, the apparatus can be rinsed by returning the FORWARD/DIVERT valves to the FORWARD state while the flow controls continue to charge the blenders with the component from the other loop until the other component has forced all the blend out of the blenders and out of any sections of the apparatus downstream of the blenders.

This procedure, the advantages of which have been indicated hereintofore, can also be carried out by activating valves that disengage lines leading from the other loop or FORWARD/DIVERT valve to the blenders.

The blend rinsed out of the blender or the downstream sections of the apparatus can be forwarded for disposal or further processing to a receptacle, optionally by way of bypasses just upstream of the compression-setting molds.

Several injectors can be synchronized and operate simultaneously once the upstream blenders have been successively charged with components, in different proportions for example.

The molds can be supplied with the blend in a vacuum if the vacuum is generated during the second through fourth steps (charging the blenders).

If there is a pressure gauge downstream of the spout and the spout opens air-tight into a mold or compression-setting mold for example, the injector can be controlled by the pressure gauge for a prescribed length of time to maintain a prescribed pressure inside the mold. It is preferable for the time to be approximately the same as the time needed to charge a series of blenders in succession.

Controls can maintain the temperatures of both the components and the blend within a range that is too low to allow curing during the blending process and increase them to a range that does allow curing only during or after injection of the blend into the mold by the injector.

The prescribed time can be as long as or longer than the time it takes the blend to shrink while it cures in the mold.

The pumps and valves, finally, in one preferred embodiment of the invention can be controlled by an overall microprocessor. Microprocessor control also facilitates supplying blends of different proportions to compression-setting molds responsible for different types of product. Thus, one blend can consist of 50% component A, 30% component B, and 20% component C and another of 30% component A, 0% component B, and 70% component C.

BRIEF DESCRIPTION OF THE DRAWINGS

Embodiments of the present invention will now be specified by way of example with reference to the drawing, wherein.

DESCRIPTION OF PREFERRED EMBODIMENT

Figure 1:
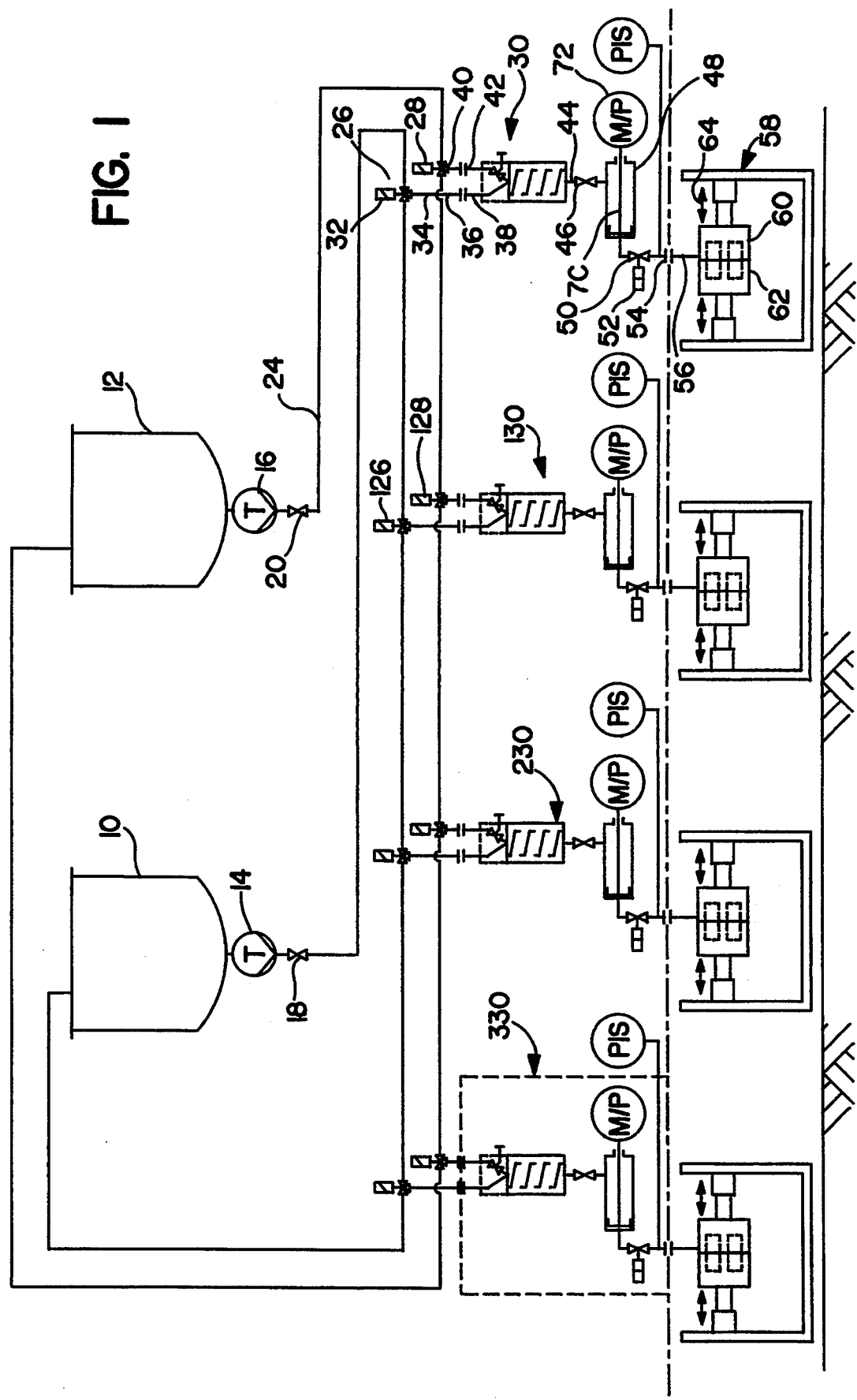
FIG. 1 is a schematic representation of overall apparatus in accordance with the invention that can be employed to carry out the method in accordance with the invention.

The apparatus illustrated in FIG. 1 is intended for supplying viscous blends, casting resins for example, of in the present case two components, resin and hardener for example, that react and cure when blended. The apparatus includes two holding tanks. Tank 10 contains a mixture of polyester resin and filler in the form of particles of quartz. Tank 12 contains liquid hardener. Tanks 10 and 12 could contain other starting components instead of that particular resin and filler. The apparatus could also include more than two starting-component holding tanks. The tanks could for example contain isocyanate and polyalcohol, which react rapidly into polyurethane even when cool, instead of polyester and hardener, which cure relatively slowly and not at all when too cool.

Tanks 10 and 12 can have a capacity of 300 and be equipped with agitators and controls that maintain their contents at a particular temperature, near conventional room temperature for example.

A pipeline extends out of tank 10, through flow controls 14, through a check valve 18, through a series of FORWARD/DIVERT valves 26 and 126 etc., and back into the tank, creating a closed loop 22. Another pipeline extends out of tank 12, through flow controls 16, through a check valve 20, through a series of FORWARD/DIVERT valves 28 and 128 etc., and back into the tank, creating another closed loop 24. Valves 26, 126, 28, and 128 each have one intake and two alternative outlets. Controls 32 open and close the outlets alternatively.

When valves 26 and 126 are in the FORWARD state, flow controls 14, which can be a variable-capacity pump for example, circulate a specific volume of one component per stage of operation or per unit of time out of tank 10, through valves 18, 26, and 126, and back into the tank through loop 22. Again, when valves 28 and 128 are in the FORWARD state, flow controls 16, which can also be a variable-capacity pump for example, similarly circulate a specific volume of the other component per stage of operation or per unit of time out of tank 12, through valves 16, 28, and 128, and back into the tank through loop 24. When valves 26, 126, 28, and 128 are in the DIVERT state, they divert the components flowing through the loops out of the loops. The component, resin in this case, flowing through loop 22 is diverted by valves 26 and 126 through lines 34, flanged joints 36, and intakes 38 to blenders 30, 130, 230, and 330. The other component, the hardener, is diverted out of loop 24 by valves 28 and 128 through lines 40, other flanged joints, and intakes 42 to blenders 30, 130, 230, and 330 as well. The two or more components arrive in the blenders in specific proportions and are processed in known ways by kneading and heating or cooling for example that will not be further specified herein. The resulting homogenous blends leave the blenders through outlets 44, preferably having been degassed in a vacuum and at a prescribed temperature. The blends can also be at a specific pressure due to the back-up pressure generated by the blending procedure. The blends now arrive through optional check valves 46 in injectors 48 in the form of a plunger-and-cylinder mechanisms. These mechanisms forward the blends through ON-OFF valves 50 that open and close subject to controls 55 to appropriate spouts 54. Spouts 54 can communicate air-tight with intake in the form of gates 56 into casts or compression-setting molds 58. The molds in the present case are in two halves 60 and 62 that slide together and apart in the direction indicated by double-headed arrow 64 to close and open. The blends are injected by a known procedure through gates 56 into the closed molds, where they cure subject to heat. Halves 60 and 62 are separated and the molding removed and forward for further processing.

The various molds 58 illustrated in FIG. 1 can also be charged at atmospheric pressure.

Figure 2:
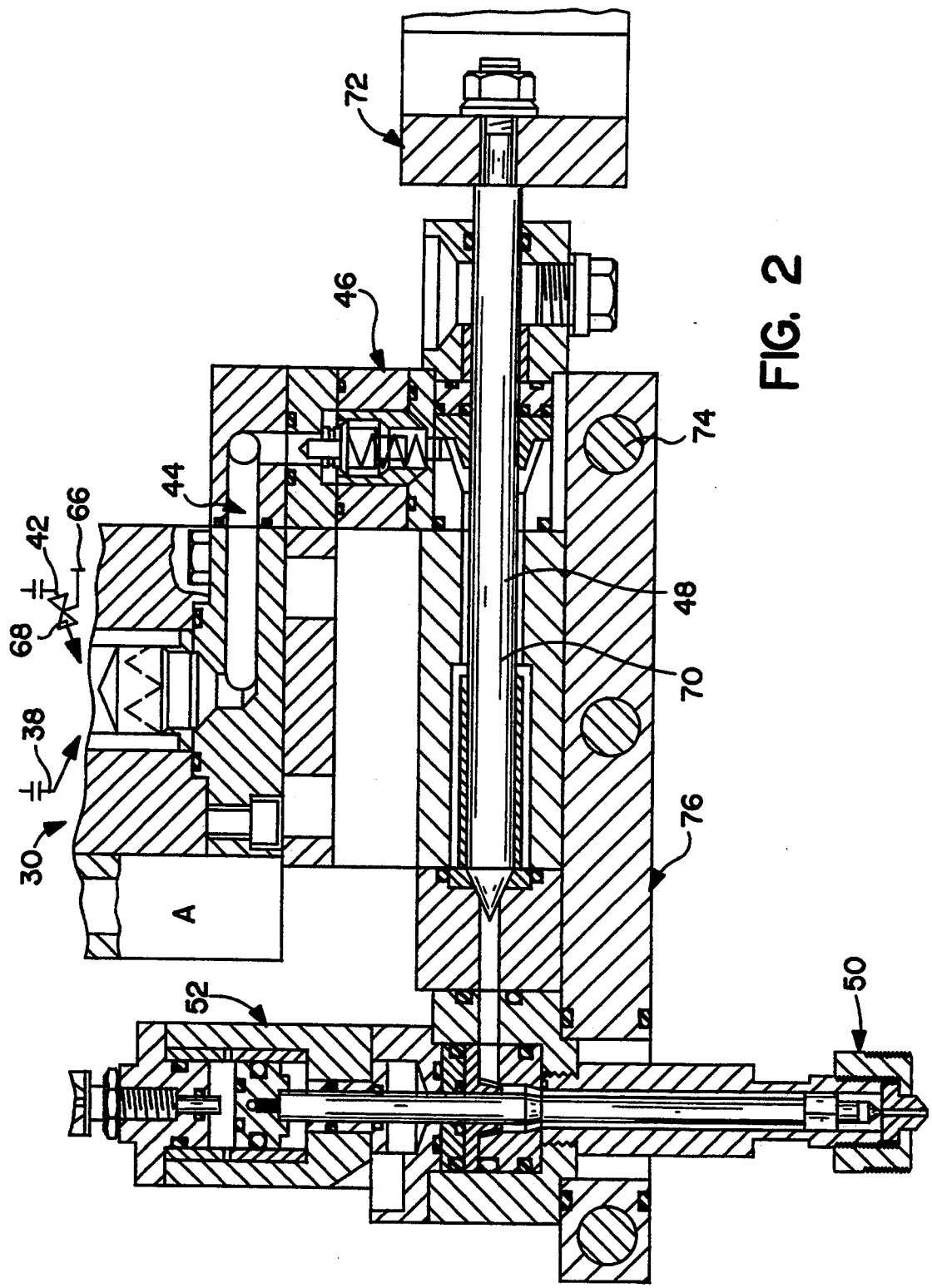
FIG. 2 illustrates one possible practical embodiment of the subassembly 330 in FIG. 1 comprising a blender and a downstream injector.

FIG. 2 illustrates one possible embodiment of a blender 30 with a schematically represented intake 38 for one component and another schematically represented intake 42 for another component that is to blended with the first. The component entering through intake 38 can be an epoxide resin for example and the component entering through intake 42 an appropriate hardener. As will be evident from FIG. 2 (as well as from FIG. 1), the blender is also provided with a valve 68 that can be opened and closed by controls 66. The flow of the component entering through intake 42 can accordingly be interrupted so that only the component, resin for instance, entering through intake 38 will arrive in the blender and will eventually completely occupy and rinse out both the blender and any downstream sections of the apparatus.

Figure 4:
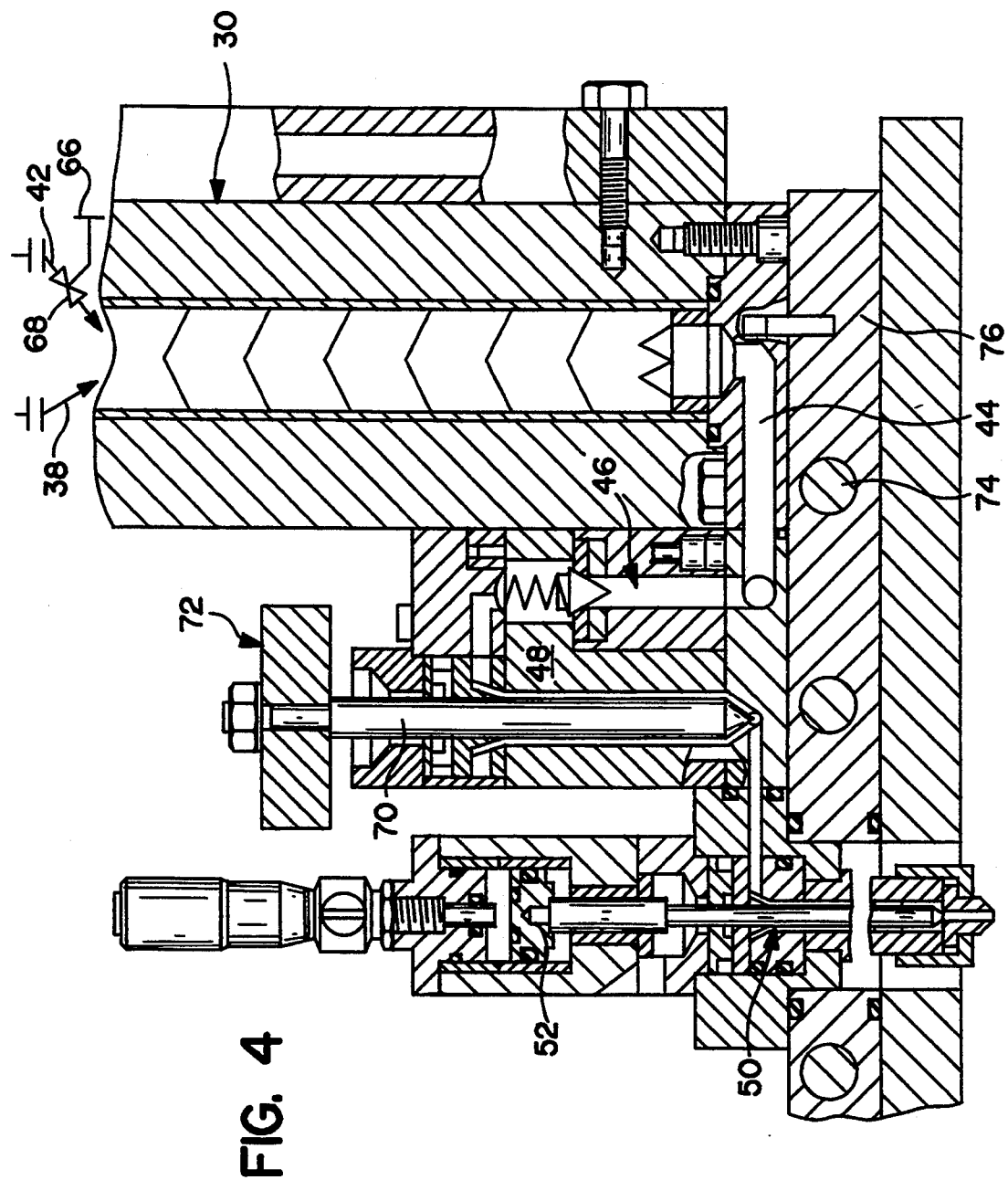
FIG. 4 is a different version of the embodiment illustrated in FIG. 2.

The designs illustrated in FIGS. 2 and 4 can to some extent be realized with already known mechanisms. A blender 30 similar to the one illustrated in FIG. 4 for example is known from the present applicants' German publication 3 803 419 A1, to which the reader is referred for further details. The known blender has, however, been modified to some extent, with an outlet 44, an optional check valve 46, an injector 48 in the form of a cylinder and plunger, and a downstream ON-OFF valve 50 subject to controls 52.

As will also be evident from FIG. 1, there is a pressure gauge PIS between ON-OFF valve 50 and spout 54 that detects the pressure of the blend entering compression-setting mold 58. Pressure gauge PIS is connected in an unillustrated way with a drive mechanism M/P. When drive mechanism M/P is activated and ON-OFF valve 50 is open, enough blend will be supplied to spout 54 or mold 58 to maintain a prescribed pressure, allowing compensation for any shrinkage that occurs in mold 58 as the molding cures. Compensation and maintenance of a specific pressure in the mold is accordingly made possible by a mechanism, the injector, that is already present in any case, and the buffers disclosed in German 2 748 982 C3 for that purpose and entailing so many drawbacks will not be necessary.

The effectiveness of the rinsing procedure made possible by the valve 68 illustrated in FIG. 2 can be considerably increased by filling the resin for example employed for rinsing with powdered quartz to make it more abrasive. The abrasion will result in a particularly thorough scrubbing out of the lines in the apparatus illustrated in FIG. 2, leaving nothing behind to form a deposit and clog up the apparatus.

As will be evident from FIG. 2, with reference to a similar system known from German 3 803 419 A1, and from FIG. 4, the apparatus operates without liquid sealants of the type employed for example in German 2 748 982 C2. This feature makes it possible to work with materials like isocyanate and polyalcohol to make polyurethane. These materials are especially sensitive to the contamination that is unavoidable with liquid sealants.

Since the blend has to travel only a short distance after it leaves the blender, such rapidly reacting and critical materials as polyurethane can be employed. Since the component are constantly circulating through loops 22 and 24 and since the downstream sections can be rinsed through valve 68 for example, the risk of fillers depositing in the lines is also considerably reduced, and the apparatus as a whole will have to be thoroughly cleaned only rarely (after several months). This feature considerably facilitates maintenance.

Pressure gauges PIS also make it possible to monitor the charging process in that unillustrated overall controls can determine from the increased pressure when a mold is full. Drive mechanism 72 (M/P), an electric motor or pneumatic capacity for instance, will in this event immediately lift the plunger in injector 48, allowing blend to leave blender 30 and enter the newly accessible space in injector 48. The plunger can now be lowered again and can exert the desired intermediate pressure subject to the pressure gauge.

Temperature controls, channels 74 that convey a liquid coolant through a heat-conducting plate 76 for example, make it possible to keep the overall apparatus illustrated in FIG. 2 at a relatively low temperature of 30° to 40° C. for example, too low to initiate curing. Mold halves 60 and 62 on the other hand can be heated to a range of 80° to 150° C. to rapidly initiate curing once the mold has been completely charged. Any shrinkage that occurs during the curing process will be compensated by the influx of still liquid blend.

Spout 54 is removed from the gate 56 illustrated in FIG. 1 once curing is complete, and plunger 70 is completely retracted, transferring any excess blend to an unillustrated receptacle for later disposal or reprocessing. A new cycle now begins with an empty mold 58 being positioned with its gate 56 below spout 54 and connected to it air-tight.

The method now to be specified may accordingly be followed. Although only two tanks and four blenders and molds and their accessories are mentioned, as many as necessary can be employed. Such a material as casting resin, polyurethane, etc., a blend, that is, of two or more components that react and cure when blended, is to be supplied at atmospheric pressure or in a vacuum to several casts or compression-setting molds 58 (four of which are illustrated in FIG. 1).

Loops 22 and 24 are completely occupied by their respective components. Flow controls 14, which can for instance be microprocessor controlled, pump a prescribed volume of one component, resin for example, out of tank 10 and into loop 22 through check valve 18. Flow controls 16, which can for instance also be microprocessor controlled, pump a prescribed volume of the other component, resin for example, out of tank 10 and into loop 24 through check valve 16. Since valves 26 and 28 are in the FORWARD state, the components will flow on through valves 126 and 128. Since valves 126 and 128 are in the DIVERT state, the components will be diverted to blender 130. Since the loops are completely charged, flow controls 14 and 16 will charge blender 130 with precisely as much of the components as they remove from the tanks during the current stage of operation.

Valves 126 and 128 are now, during the next stage, returned to the FORWARD state, disestablishing communications with blender 130 and allowing the components to flow on farther through the loops. The valves associated with blender 230, however, are simultaneously switched to the DIVERT state and flow controls 14 and 16 charge blender 230 with preferably precisely as much of the components as they previously charged blender 130 with. The same procedure is now repeated in relation to blenders 330 and 30. All four blenders have now been charged with both components.

Each blender begins to operate as soon as it has been charged and continues to operate for a specified length of time, subsequent to which and independently of the states of the other blenders, the blend is injected into the associated mold 58 through the associated injector 48 and curing and shrinkage compensation if desired are initiated for a specific length of time. The same procedures will of course occur somewhat simultaneously in the other molds.

Figure 3:
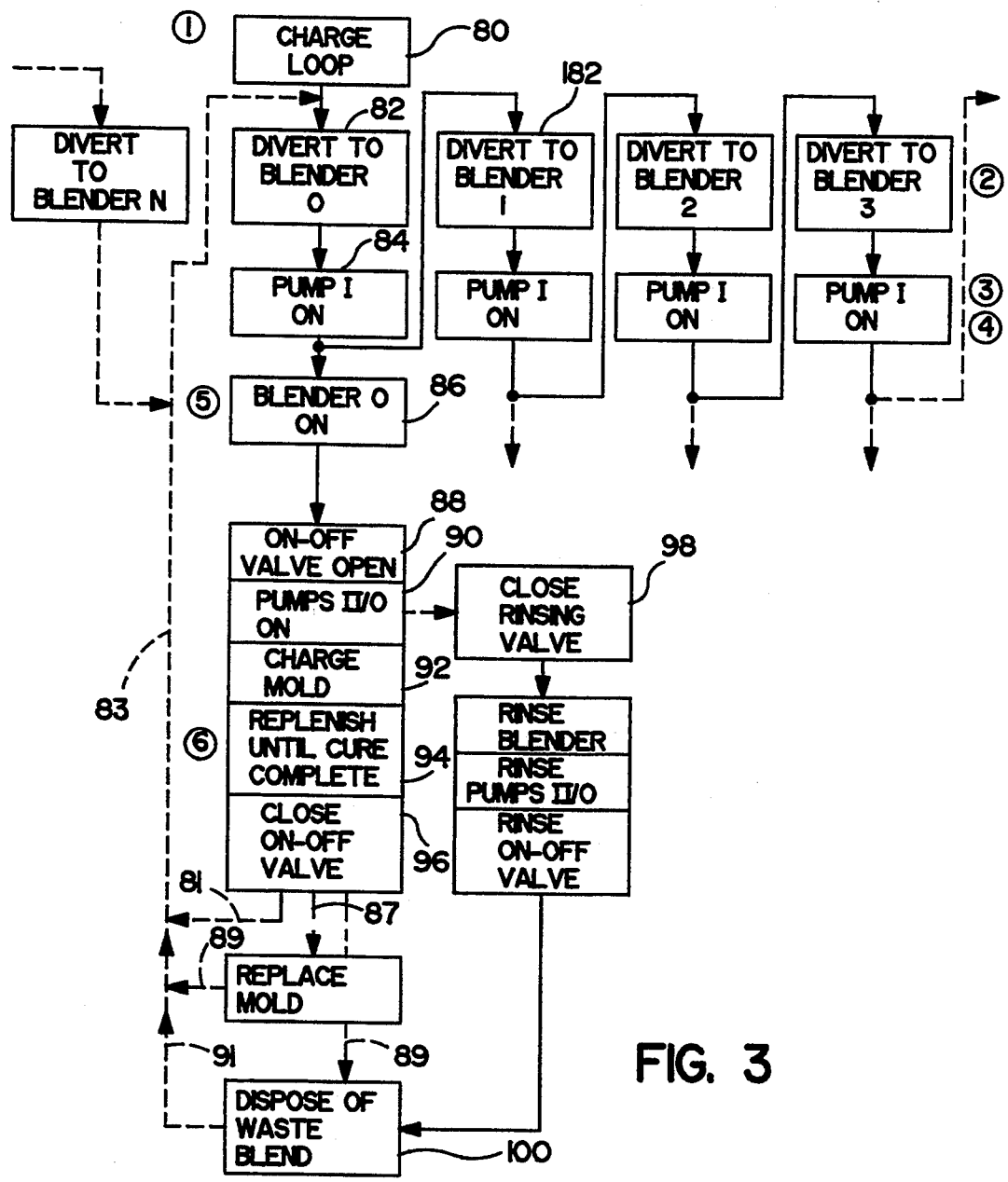
FIG. 3 is a flow chart illustrating the method in accordance with the invention.

FIG. 3 is a flow chart illustrating the preferred embodiments of the method in accordance with the invention that can be carried out with the apparatus in accordance with the invention.

The method relates to the operation of apparatus supplying viscous blends of two or more components that react and cure when blended. The components are stored in tanks 10 and 12 for example. The tanks are equipped with pumps 14 and 16 and valves 18 and 20 that control the flow of components. Valves 18 and 20 can, however, be eliminated if controls 14 and 16 are designed to prevent the components from flowing backward. Flow controls 14 and 16 open into loops 22 and 24. The loops extend through a series of valves 26 and 28 etc. with two alternative outlets and finally return to the tanks. Each alternative-outlet valve is associated with a blender 30 etc. that communicates optionally by way of a check valve 46 with an injector 48, a plunger-and-cylinder mechanism for example. The injector communicates through an ON-OFF valve 50 with a cast or compression-setting mold 58, which the blend is to be supplied to. How such apparatus is operated will now be described.

First (box 80 in FIG. 3), the loops are totally charged with their associated components. The state of the FORWARD/DIVERT valve associated with one of the blenders, blender 30 for instance, is now changed to DIVERT (box 82) so that, when the pumps I (flow controls 14 and 16 in FIG. 1) associated with each tank are activated, the components will no longer circulate all the way through the loop with the FORWARD/DIVERT valves in the FORWARD state as they did while the loops were being charged, but as much of each component as the flow controls, due to their rate and duration of operation, remove from the tanks will be diverted to the particular blender. The FORWARD/DIVERT valve associated with the first blender, blender 0 in FIG. 3, is now returned to the FORWARD state and the state of the FORWARD/DIVERT valve associated with another blender, blender 1 in FIG. 3 for instance, is changed to DIVERT (box 182), allowing the mixer to be similarly charged. It is conceivable, however, to charge the blender with a different proportion of components by resetting the flow controls. The FORWARD/DIVERT valve associated with blender 1 can now be returned to FORWARD and the state of the FORWARD/DIVERT valve associated with the next blender, blender 2 in FIG. 3, changed to DIVERT, etc.

Any desired number N of blenders can accordingly be charged in sequence with any volume and proportion of two or more components, upon which the sequence can begin again with blender 0. While this sequence of charging the blenders one after the other is in progress as illustrated by box 84 in FIG. 3, other procedures can be simultaneously undertaken, specifically activating the blender that blends and optionally heats or cools the various components conveyed to blender.

Upon termination of the blending process, the downstream injector is charged and injects the blend as represented for example by box 88 (opening the ON-OFF valve into mold 58), the pump II or injector 48 associated with the particular blender is activated by drive mechanism 72 (box 90), charging a mold 58 (box 92), any shrinkage that occurs as the blend cures is compensated (box 94), and ON-OFF valve 50 is closed again (96) to discontinue the supply of blend. The operation now returns to box 82 in the direction indicated by arrows 81, 83, and 85. It is sometimes necessary to wait before commencing the step represented by box 82 until the blender, blender 0 in the present case, is again on line during the step of charging the individual blenders 1 through N. If there are only a few blenders and if they are rapidly charged, the central controls that control the procedure, which can operate digitally in conjunction with a microprocessor for example, will wait until informed that the procedure has been terminated at box 96.

A mold can alternatively be replaced once the ON-OFF valve has been closed when such a mold is available as represented by arrows 87, 89, 83, and 85, or any blend still remaining in the pumps can be removed ahead of time by again opening the ON-OFF valve and activating the injector (in the downstream pumps). This material can be disposed of or added to a receptacle. The procedure now reverts to box 82 along arrows 89, 91, 83, and 85.

It has already been mentioned herein that the method can also be employed with more than two components, with three holding tanks for three different components A, B, and C for example. These three components can be blended in different proportions for each compression-setting mold subject to microprocessor control, with mold 1 receiving components A, B, and C in the ratio 30:30:40, 60:0:40 (components A and C only), or 0:10:90 (components B and C only) for example.

Thus moldings that differ not only in shape (depending on the shape of the mold) but also of a composition ideal for that shape or for other conditions can be produced simultaneously in the same apparatus.

What is claimed is:

1. An apparatus for supplying viscous blends of two or more components that react and cure when blended comprising
   a) one holding tank for each component,
   b) a set of flow controls downstream of each holding tank,
   c) a valve in or downstream of each set of flow controls,
   d) a line downstream of each set of flow controls or of each valve,
   e) blenders communicating with each line, and
   f) an injector downstream of each blender and supplying the blend to a compression-setting mold,
   the improvement wherein the line leading out of each holding tank and through the flow controls and check valve extends past each blender and back into the tank, accordingly constituting a closed loop that begins and ends at the tanks, the loops extending through FORWARD/DIVERT valves with one intake and two alternatively opening and closing outlets, one outlet forwarding the component on through its loop and the other outlet diverting it out of the loop to one of the blenders, each flow control being a variable-capacity pump upstream of a check valve.

2. Apparatus as in claim 1, wherein the injectors are blended-forwarding plunger-and-cylinder injectors upstream of an ON-OFF valve.

3. Apparatus as in claim 2, wherein the ON-OFF valve communicates with a spout that opens into the compression-setting mold.

4. Apparatus as in claim 3, including a pressure gauge between the compression-setting mold and the ON-OFF valve governing the operation of the injector.

5. Apparatus as in claim 1, wherein valves that engage and disengage at least one of the two or more lines leading from the loops are positioned just upstream of the blenders.

6. Apparatus as in claim 5, including a bypass directly downstream of the spout, conveying the material, one of the components serving to rinse out the apparatus past the mold and either into a receptacle for disposal or further processing or back to the holding tank.

7. The method of operating apparatus for supplying viscous blends of two or more components that react and cure when blended, the apparatus comprising
   a) one holding tank for each component,
   b) a set of flow controls comprising variable-capacity pumps downstream of each holding tank,
   c) a check valve in or downstream of each set of flow controls, and
   d) a closed loop downstream of each set of flow controls and check valve and leading up to each blender and then back to the holding tank,
   e) each loop extending through FORWARD/DIVERT valves with one intake and two alternatively opening and closing outlets, one outlet forwarding the component on through the loop and the other outlet diverting it out of the loop to one of the blenders, wherein the following steps are performed:
1. first, the flow controls continue supplying each loop with its particular component until it is fully charged and the component is returning to the holding tank,
2. second, the FORWARD/DIVERT valves that divert the components to a particular blender disestablish communications with the loops and divert the components flowing through the loops to the blender
3. third, the flow controls remain in operation until the blender contains a specific volume of the components,
4. fourth, the first and second steps are repeated with at least one more blender,
5. fifth, the blenders proceed to blend the components and condition the blend, and
6. sixth, the blend is introduced into compression-setting through the injectors.

8. Method as in claim 7, wherein both the second, third, and fourth steps and the fifth and sixth steps are carried out independently and either simultaneously or overlapping.

9. Method as in claim 7, wherein once the second through fourth steps (charging the blenders) or second through sixth steps (charging the molds) have been repeated a specific number of times, the apparatus is rinsed by returning the FORWARD/DIVERT valves to the FORWARD state while the flow controls continue to charge the blenders with the component from the other loop until the other component has forced all the blend out of the blenders and out of any sections of the apparatus downstream of the blenders.

10. Method as in claim 9, wherein the blend rinsed out of the blender or the downstream sections of the apparatus is forwarded past the molds to a holding tank for disposal or further processing, by way of bypasses just upstream of the compression-setting molds.

11. Method as in claim 7, wherein the molds are supplied with the blend in a vacuum, and the vacuum is generated during the second through fourth step (charging the blenders).

12. Method as in claim 7, wherein there is a pressure gauge downstream of the spout and the spout opens air-tight into a mold, and the injector is controlled by the pressure gauge for a prescribed length of time to maintain a prescribed pressure inside the mold.

13. Method as in claim 12, wherein the time is approximately the same as the time needed to charge a series of blenders in succession.

14. Method as in claim 12, wherein the prescribed time is as long as or longer than the time it takes the blend to shrink while it cures in the mold.

15. Method as in claim 7, wherein the pumps and valves are controlled by an overall microprocessor.

* * * * *